(12) United States Patent
Goto

(10) Patent No.: US 7,484,751 B2
(45) Date of Patent: Feb. 3, 2009

(54) AIR BAG SYSTEM FOR VEHICLE

(75) Inventor: Hiroshi Goto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 11/347,214

(22) Filed: Feb. 6, 2006

(65) Prior Publication Data

US 2006/0175811 A1 Aug. 10, 2006

(30) Foreign Application Priority Data

Feb. 9, 2005 (JP) ............... 2005-033254

(51) Int. Cl.
*B60R 21/16* (2006.01)
(52) U.S. Cl. ............... 280/728.1; 2/69.5; 2/462; 2/463; 2/DIG. 3; 280/729; 280/730.1; 280/743.2
(58) Field of Classification Search ............ 280/730.1, 280/743.1, 743.2, 728.1, 729; 2/2.5, 2.14, 2/102, 108, 462, 463, 69.5, DIG. 3; 441/87, 441/88, 102, 106, 108
See application file for complete search history.

(56) References Cited

U.S. PATENT DOCUMENTS

| 4,059,852 A * | 11/1977 | Crane ............... 2/456 |
| 4,639,944 A * | 2/1987 | Lashley et al. ............... 2/456 |
| 5,781,936 A * | 7/1998 | Alaloof ............... 2/456 |
| 5,867,842 A * | 2/1999 | Pinsley et al. ............... 2/462 |
| 6,125,478 A * | 10/2000 | Alaloof ............... 2/456 |
| 6,543,054 B2 * | 4/2003 | Gabriel ............... 2/1 |
| 6,681,399 B1 * | 1/2004 | Kerr ............... 2/2.5 |
| 7,261,608 B2 * | 8/2007 | Haddacks ............... 441/80 |

FOREIGN PATENT DOCUMENTS

| EP | 0925730 A | 6/1999 |
| GB | 2345031 A | 6/2000 |
| JP | 9-66789 A | 3/1997 |

OTHER PUBLICATIONS

Safety Info No. 5 of the Federal Agency for Roads; Aug. 2005.

* cited by examiner

*Primary Examiner*—Eric Culbreth
(74) *Attorney, Agent, or Firm*—Birch, Stewart, Kolasch & Birch, LLP

(57) ABSTRACT

In a wearable air bag system which a rider puts on beforehand, a prominent impact load can be dispersed by hard protectors, and an impact on the rider can be effectively cushioned by air bags. In one embodiment, a front air bag for covering a chest portion of a rider is provided in a front main section of a jacket worn by the rider. A rear air bag for covering a back portion of the rider is provided in a rear main section of the jacket. Front and rear hard protectors are provided on the outer surfaces of the air bags, respectively.

21 Claims, 5 Drawing Sheets

AIR BAG-ACTIVATED CONDITION

AIR BAG SYSTEM FOR VEHICLE

CROSS-REFERENCE TO RELATED APPLICATIONS

The present application claims priority under 35 USC 119 to Japanese Patent Application No. 2005-033254 filed on Feb. 9, 2005 the entire contents of which are hereby incorporated by reference.

FIELD OF THE INVENTION

The present invention relates to an air bag system which is suitable for a vehicle, particularly for a two-wheeled motor vehicle wherein a rider puts on the air bag system beforehand on his or her body to cushion an impact on the rider.

DESCRIPTION OF BACKGROUND ART

Wearable air bag systems are known for vehicles, particularly for two-wheeled motor vehicles. See, for example, Japanese Unexamined Patent Publication No. Hei 9-66789. In such a wearable air bag system, a rider wears a clothing article provided with an air bag module including an air bag body and an inflator. When a two-wheeled motor vehicle has had a collision, the inflator is actuated, and the air bag is expanded and deployed to cushion an impact on the rider.

In a known wearable air bag system, an air bag body provided on a clothing article worn by a rider includes a bag-shaped member and becomes an expanded elastic body by containing high-pressure gas generated by an inflator. The air bag body is formed by only a bag-shaped member. Accordingly, when a two-wheeled motor vehicle is subjected to an excessive impact force of some prominence that collides against the air bag, an excessive load locally and intensively acts on the air bag body. This may affect a function of the air bag body which cushions an impact on the rider.

SUMMARY AND OBJECTS OF THE INVENTION

The present invention has been accomplished in view of the above-described circumstances. An object of an embodiment of the present invention is to provide a new vehicular air bag system in which an impact locally acting on an air bag is dispersed to the entire region thereof.

In order to achieve the above-described object, a first aspect of an embodiment of the present invention is to provide a vehicular air bag system wherein a rider puts on the air bag system beforehand on his or her body to cushion an impact on the rider. The vehicular air bag system includes at least one air bag which covers the body of the rider and which is provided on a clothing article worn by the rider, and at least one hard protector which disperses an impact acting on the at least one air bag and which is provided on the at least one air bag.

Further, in order to achieve the above-described object, a second aspect of an embodiment of the present invention is to provide the vehicular air bag system according to the first aspect, wherein the at least one air bag includes a front air bag for covering a chest portion of the rider and a rear air bag for covering a back portion of the rider. The at least one hard protector includes a front hard protector and a rear hard protector. The front hard protector is provided on the front air bag, and the rear hard protector is provided on the rear air bag.

According to the first aspect of the present invention, the rider can disperse a prominent local impact load using the hard protector. Thus, an impact on the rider can be effectively cushioned by the air bag.

Further, according to the second aspect of the present invention, a prominent impact load can be dispersed by the front and rear hard protectors. Thus, an impact on the rider can be effectively cushioned by the front and rear air bags.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be specifically described based on examples of the present invention with reference to FIGS. 1 to 4.

First, referring to FIGS. 1 to 4, a first example of the present invention will be described. In the first example, an air bag system of the present invention is applied to a two-wheeled motor vehicle.

Figure 1:
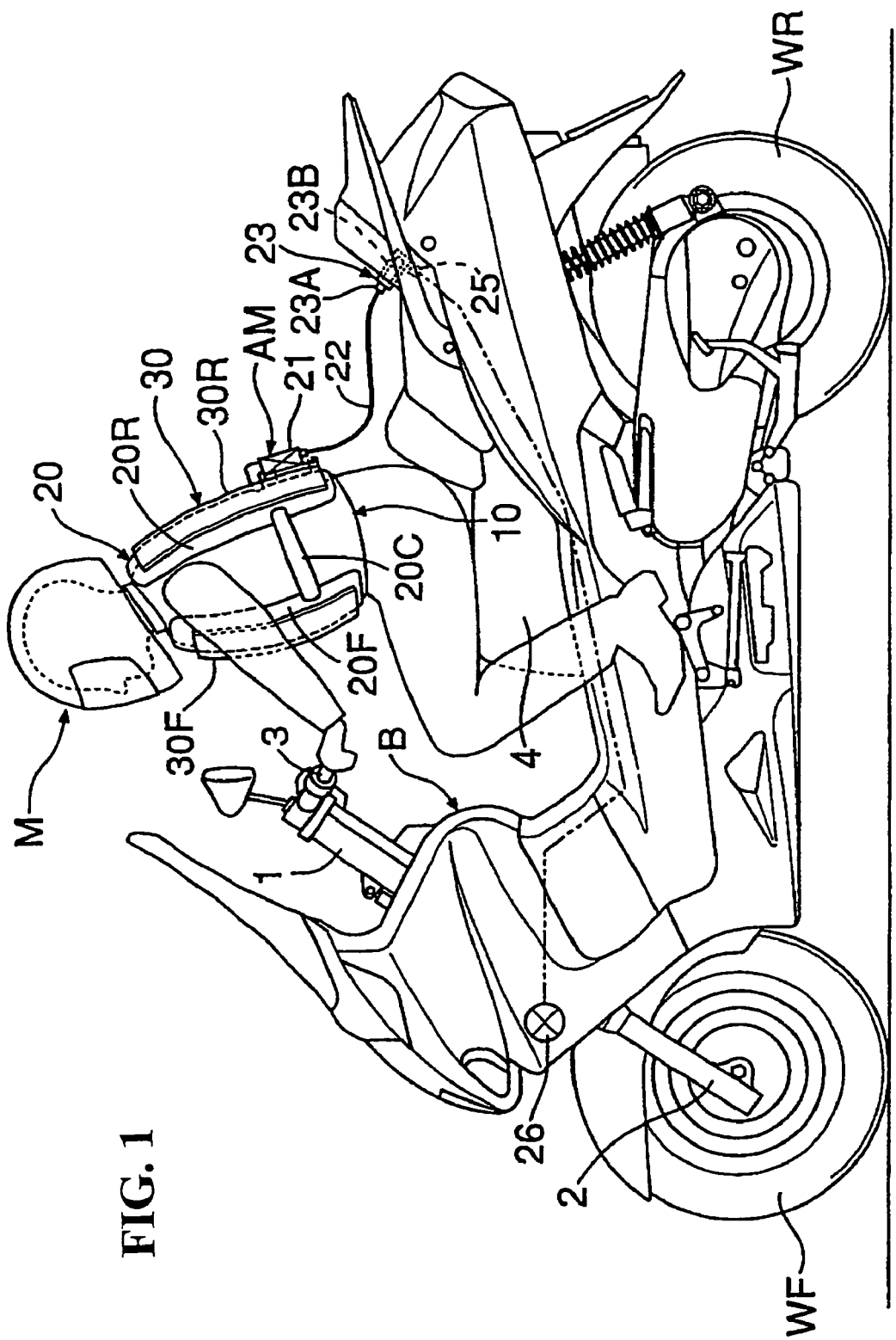
FIG. 1 is a side view of a two-wheeled motor vehicle provided with an air bag system for a vehicle.

In FIG. 1, a front fork 2 to which a front wheel WF is rotatably attached is supported by a head pipe 1 at the front end of a vehicle body B of the two-wheeled motor vehicle so as to allow steering with a steering handle 3 being provided at a top portion of the front fork 2. Further, a rear wheel WR, which is driven by an engine (not shown) supported by the vehicle body B, is suspended in a rear portion of the vehicle body B. On the top surface of a rear half portion of the vehicle body B, a seat 4 is provided. A rider M wearing a clothing article, e.g., a jacket 10 (described later in detail), sits on the seat 4.

Figure 2:
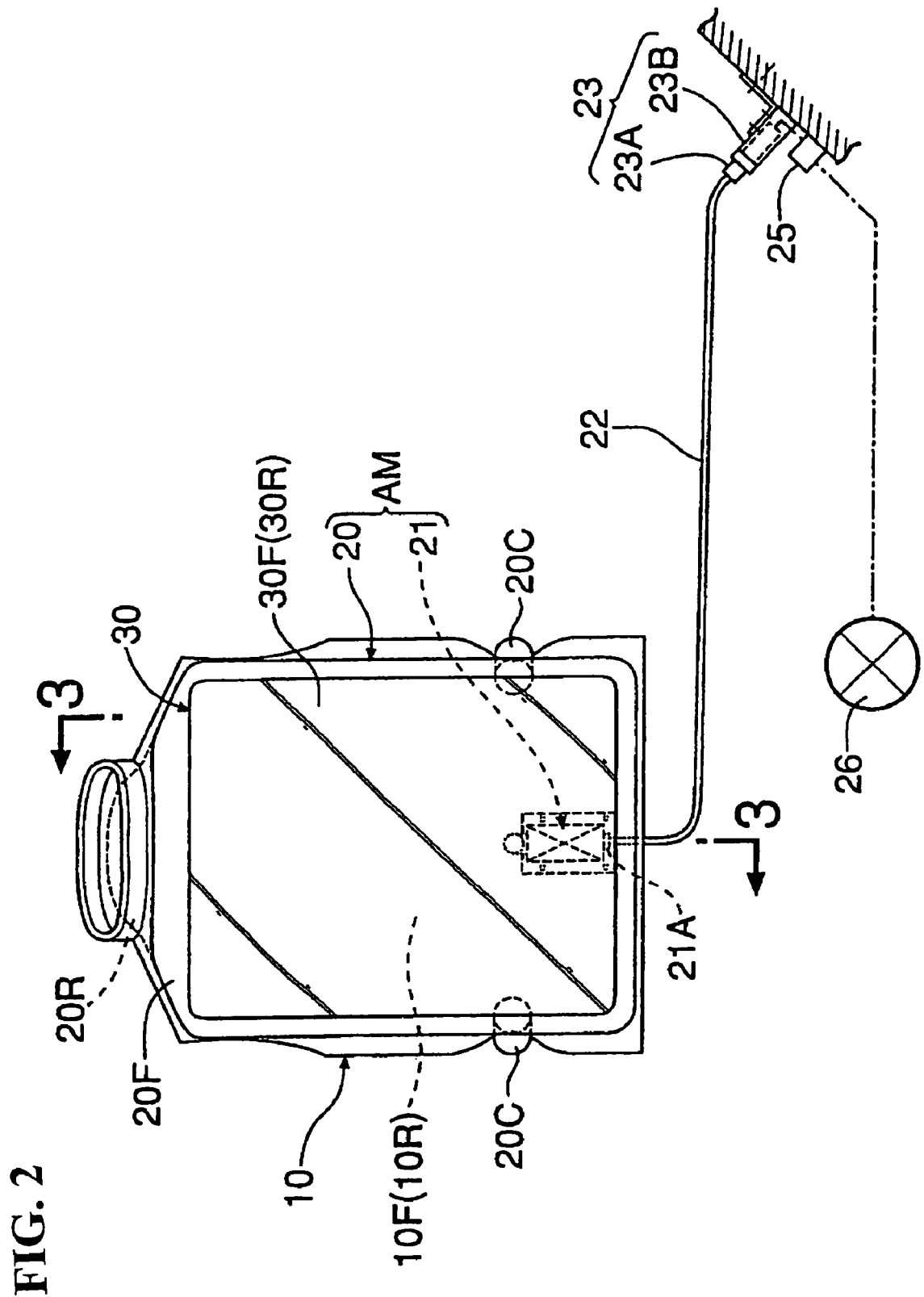
FIG. 2 is a general view of the air bag system.
Figure 3:
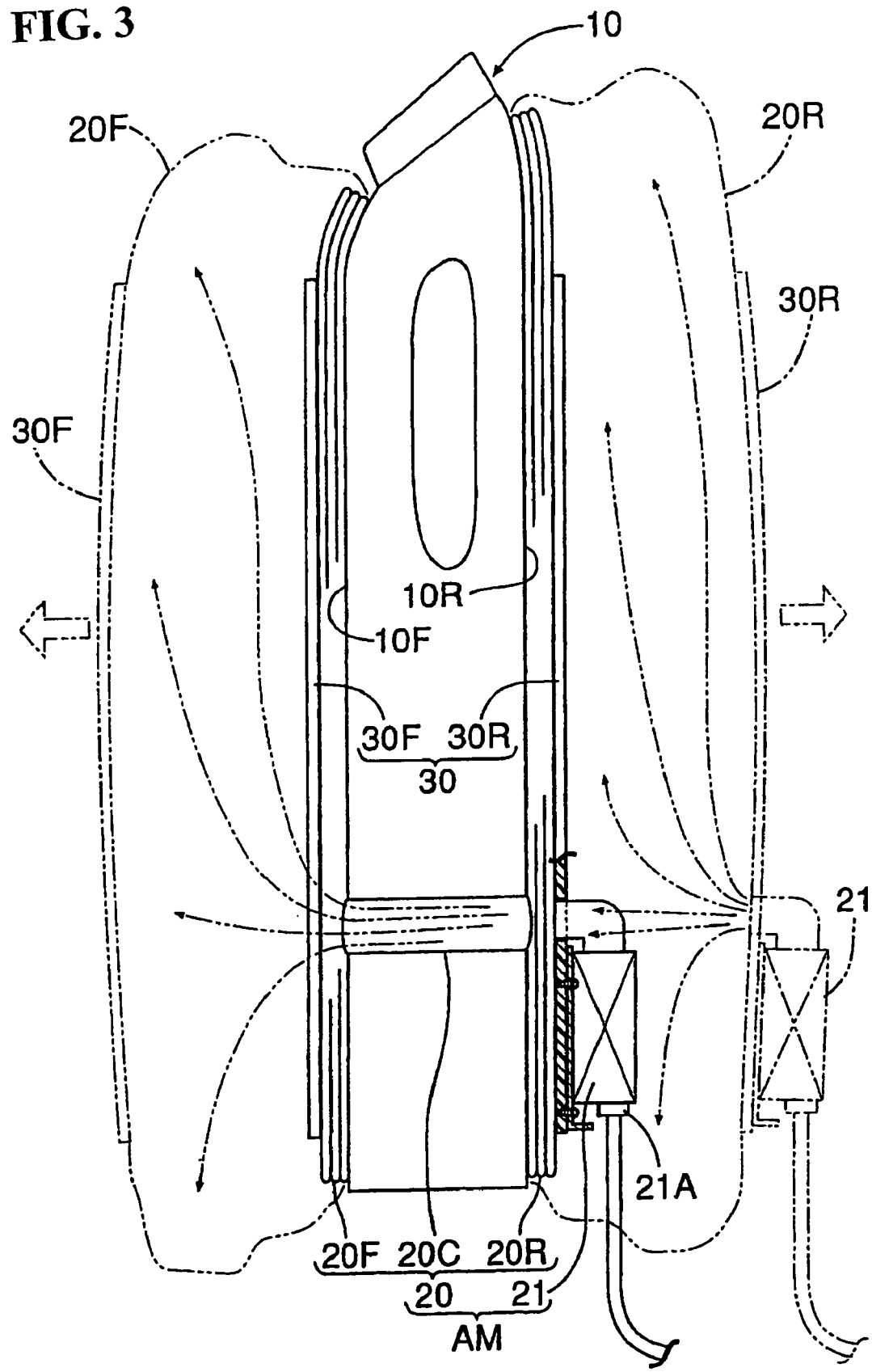
FIG. 3 is an enlarged cross-sectional view taken along line 3-3 of FIG. 2.

As illustrated in FIGS. 1 to 3, an air bag module AM is provided on the jacket 10. This air bag module AM includes an inflator 21 which generates high-pressure gas at the time of activation wherein air bags 20 are expanded and deployed by the gas generated by the inflator 21 to cushion an impact on the rider M. The inflator 21 is fixed to a rear hard protector 30R, described later, which is provided on a lower portion of the back surface of the jacket 10. A control cord 22 is connected to a working portion 21A of the inflator 21. This control cord 22 extends toward the rear portion of the vehicle body B, and the free end of the control cord 22 is connected to one coupler 23A of a detachable starting switch 23 provided at an appropriate position in the rear portion of the vehicle body B. The starting switch 23 includes a pair of detachable couplers 23A and 23B. When the coupling between the couplers 23A and 23B is broken, the starting switch 23 can detect the disconnection to actuate the inflator 21.

Moreover, in the rear portion of the vehicle body B of the two-wheeled motor vehicle, an electronic control unit 25 is provided close to the starting switch 23. Further, in a front portion of the vehicle body B, an impact sensor 26 is provided for detecting an impact force acting on the vehicle and for transmitting a detection signal according to the magnitude of the impact force to the electronic control unit 25. The electronic control unit 25 is configured to issue an output signal when receiving the detection signal from the impact sensor 26 and determining that the impact force is excessive. An output signal line extending from the electronic control unit 25 is connected to the detachable starting switch 23.

As illustrated in FIGS. 2 and 3, the air bags 20 are provided on the outer surface of the jacket 10. The air bags 20 include a front air bag 20F and a rear air bag 20R. The front air bag 20F is provided as one body on almost the entire outer surface of a front main section 10F of the jacket 10 so as to cover a chest portion of the rider M. On the other hand, the rear air bag 20R is provided as one body on almost the entire outer surface of a rear main section 10R of the jacket 10 so as to cover a back portion of the rider M. The front and rear air bags 20F and 20R communicate with each other through a communicating path 20C. Thus, the front and rear air bags 20F and 20R are therefore expanded and deployed by high-pressure gas from the inflator 21 at almost the same time.

Further, as illustrated in FIGS. 2 and 3, hard protectors 30 for dispersing local loads applied to the air bags 20 are provided on the air bags 20. The hard protectors 30 include a front hard protector 30F and a rear hard protector 30R. The front hard protector 30F is provided on, and integrated with, the front surface of the front air bag 20F in a stacked manner so as to cover almost the entire front surface of the front air bag 20F. Similarly, the rear hard protector 30R is provided on, and integrated with, the back surface of the rear air bag 20R in a stacked manner so as to cover almost the entire back surface of the rear air bag 20R.

The front and rear hard protectors 30F and 30R are formed in the shape of rectangular plates and made of a lightweight hard synthetic resin material such as polyamide or polypropylene or a lightweight metal material such as aluminum or titanium. These are provided on, and integrated with, the front and rear air bags 20F and 20R using attaching means such as bonding or sewing so as to follow the shapes of the outer surfaces of the air bags 20F and 20R when the air bags 20F and 20R expand and deploy. Further, when the front and rear air bags 20F and 20R expand and deploy, the front and rear hard protectors 30F and 30R move almost parallel to the forward and backward directions as indicated by two-dot chain lines in FIG. 3 so as to cover almost the entire chest and back portions of the rider M wearing the jacket 10 with the front and rear air bags 20F and 20R interposed therebetween as described later.

Next, an operation of this first example will be described.

As illustrated in FIG. 1, the rider M puts on the jacket 10 in which the air bag module AM including the air bags 20 and the inflator 21 have been provided beforehand, then sits on the seat 4 of the two-wheeled motor vehicle, and connects one coupler 23A at the free end of the control cord 22 extended from the working portion 21 of the inflator 21 to the other coupler 23B on the vehicle body B side. Thus, the inflator 21 is brought into a state of being connected to the impact sensor 26 through the starting switch 23 and the electronic control unit 25.

The rider M confirms the connection and then starts to drive the two-wheeled motor vehicle. Here, in normal driving of the two-wheeled motor vehicle, though the inflator 21 on the rider M side and the starting switch 23 on the vehicle body B side are connected through the control cord 22, the rider M can continue normal driving while freely moving his or her body with almost no awareness of the connection of the control cord 22 by appropriately relaxing the control cord 22.

Figure 4:
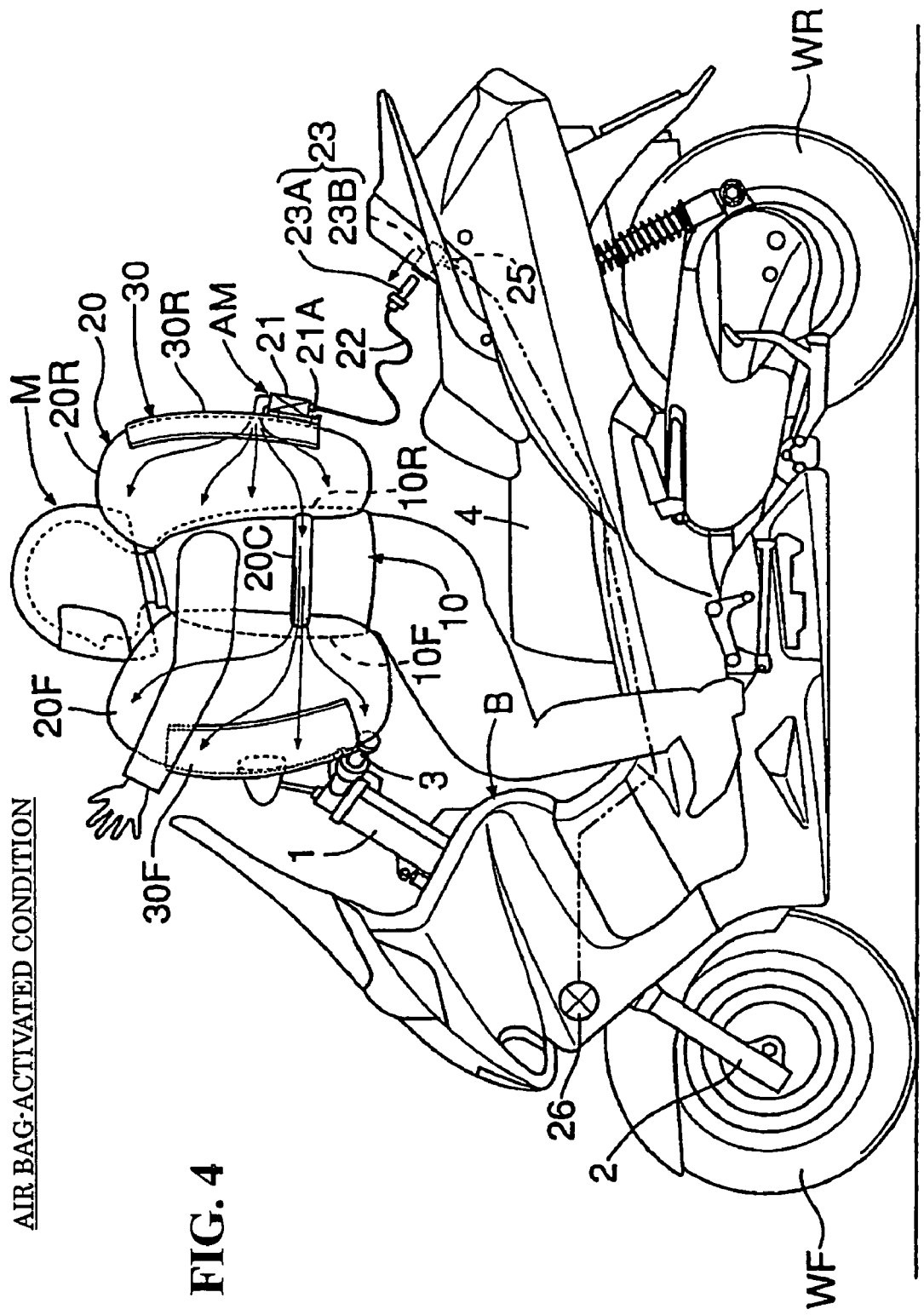
FIG. 4 is a side view of the two-wheeled motor vehicle in a state in which the air bag system is activated.

Further, when the two-wheeled motor vehicle has a collision with another vehicle, an obstacle, or the like, the impact sensor 26 detects an impact force and inputs a detection signal according to the magnitude of the impact force into the electronic control unit 25. The electronic control unit 25 determines whether the impact force is excessive or not. When the impact force has been determined to be excessive, an output signal of the electronic control unit 25 is inputted into the starting switch 23. Thus, as illustrated in FIG. 4, the coupling of the detachable starting switch 23 is forced to be broken to actuate the inflator 21. Thus, the air bags 20, i.e., the front and rear air bags 20F and 20R, expand and deploy at almost the same time and can cushion an impact on the rider M due to the collision with the obstacle, and the rider M can move away from the vehicle body B.

At this time, the front protector 30F covers a major part of the front surface of the front air bag 20F, and the rear protector 30R covers a major part of the rear surface of the rear air bag 20R. Accordingly, in the collision, when an impact load exerts a force on the front or rear air bag 20F or 20R, the impact load can be received by the front or rear hard protector 30F or 30R. Thus, the impact load is prevented from acting directly on the front or rear air bag 20F or 20R and is propagated to the air bags 20F and 20R in a dispersed manner. As a result, the impact load on the rider M can be efficiently cushioned. Further, it also becomes possible to reduce the volumes of the front and rear air bags 20F and 20R.

Next, a second example of the present invention will be described.

Figure 5:
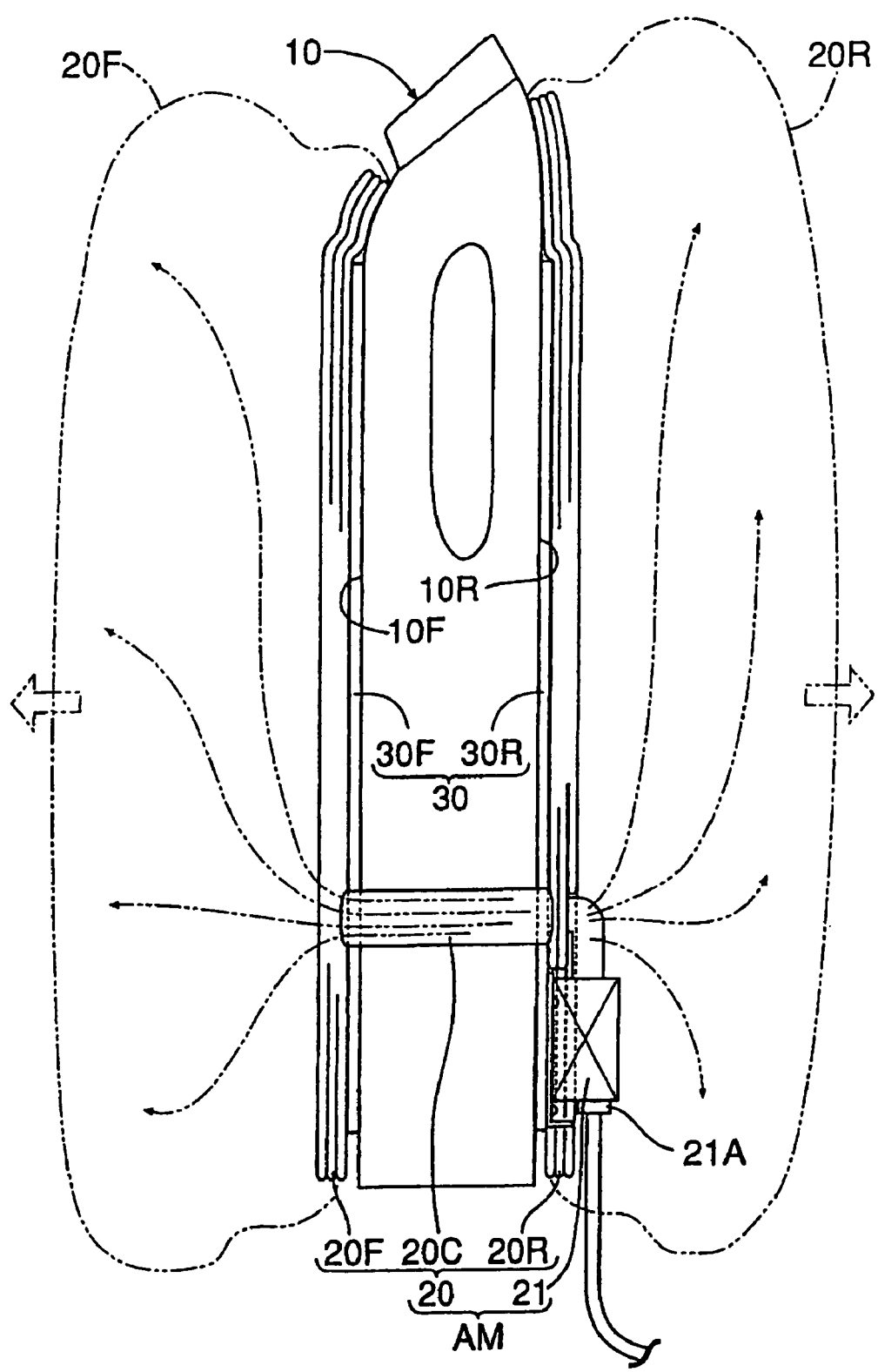
FIG. 5 is a cross-sectional view of a second example of the present invention that is similar to that of FIG. 3, which illustrates an air bag system.

FIG. 5 is a cross-sectional view similar to that of FIG. 3, which illustrates a jacket of a second example of the present invention. In FIG. 5, the same components as those of the aforementioned first example are denoted by the same reference numerals.

In this second example, the front and rear hard protectors 30F and 30R are provided on, and integrated with, the inner surfaces of the front and rear air bags 20F and 20R, i.e., the sides thereof facing the front and rear main sections 10F and 10R of the jacket 10, in a stacked manner. Other components are the same as those of the first example.

Thus, according to this second example, even if a prominent impact load acts directly on the front and rear air bags 20F and 20R locally, the load can be dispersed by the front and rear hard protectors 30F and 30R, and an impact acting on a rider can be cushioned as much as possible.

Although examples of the present invention have been described above, the present invention is not limited to the examples. Various examples can be carried out within the scope of the present invention.

For example, though a description has been given for the case where the present invention is applied to a two-wheeled motor vehicle in the aforementioned examples, it is a matter of course that the present invention can be applied to other vehicle such as a three-wheeled motor vehicle. Further, instead of the jacket, other substance having the same effect may be used as the clothing article.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular air bag system for a rider of a vehicle to cushion an impact on the rider, the vehicular air bag system comprising:
   at least one air bag for covering a body of the rider, the at least one air bag being provided on a clothing article worn by the rider; and
   at least one hard protector for dispersing an impact acting on the at least one air bag, the at least one hard protector being provided on the at least one air bag,
   wherein the at least one hard protector is centrally arranged with respect to an outer face of the at least one air bag in a manner so that, when the rider wearing the at least one air bag is viewed from a front or rear, the at least one hard protector can be seen to overlap almost an entire width and length of the outer face of at least one air bag, with only a top, a bottom and lateral side edges of the at least one air bag not being overlapped, and thus being visible.

2. The vehicular air bag system according to claim 1, wherein the at least one air bag comprises:
   a front air bag for covering a chest portion of the rider and a rear air bag for covering a back portion of the rider, and the at least one hard protector comprises a front hard protector and a rear hard protector, and
   the front hard protector is provided on the front air bag, and the rear hard protector is provided on the rear air bag.

3. The vehicular air bag system according to claim 2, and further including an inflator operatively connected to said rear air bag for inflating said front air bag and said rear air bag and for deploying said front hard protector and said rear hard protector upon actuation of said inflator.

4. The vehicular air bag system according to claim 3, and further including
   a control cord, and
   an impact sensor on the vehicle for sensing an impact force on the vehicle,
   wherein one end of the control cord is connected to said inflator, and an opposite end of the control cord is connected to a coupler of a detachable starting switch provided at a rear portion of the vehicle,
   wherein the detachable starting switch is adapted to detach from the vehicle when the sensed impact force exceeds a predetermined value, thereby actuating said inflator.

5. The vehicular air bag system according to claim 2, and further including a tube-shaped communication path operatively provided between said front air bag and said rear air bag for providing communication therebetween from said inflator to said front air bag and said rear air bag.

6. The vehicular air bag system according to claim 1, wherein the at least one air bag extends substantially across the entire chest or back of the rider in a continuous manner for providing rider protection.

7. The vehicular air bag system according to claim 1, and further including an inflator operatively connected to said at least one air bag for inflating said at least one air bag and deploying said at least one hard protector upon actuation of said inflator.

8. The vehicular air bag system according to claim 7, and further including
   a control cord, and
   an impact sensor on the vehicle for sensing an impact force on the vehicle,
   wherein one end of the control cord is connected to said inflator, and an opposite end of the control cord is connected to a coupler of a detachable starting switch provided at a rear portion of the vehicle,
   wherein the detachable starting switch is adapted to detach from the vehicle when the sensed impact force exceeds a predetermined value, thereby actuating said inflator.

9. The vehicular air bag system according to claim 1, wherein the at least one hard protector is a substantially rectangular plate constructed of a material selected from the group consisting of polyamide, polypropylene, aluminum and titanium.

10. A vehicular air bag system adapted to be used by a rider of a vehicle for cushioning an impact on a rider, the vehicular air bag system comprising:
    at least one air bag for covering at least one of a chest and a back of a rider, the at least one air bag being provided on a clothing article worn by a rider; and
    at least one hard protector for dispersing an impact acting on the at least one air bag, the at least one hard protector being provided on the at least one air bag for protecting at least one of the chest and the back of a rider,
    wherein the at least one air bag is substantially rectangular shaped and the at least one hard protector is a substantially rectangular plate,
    wherein the at least one hard protector is centrally arranged on the at least one air bag such that side edges of the at least one hard protector are substantially parallel to and inward of side edges of the at least one air bag.

11. The vehicular air bag system according to claim 10, wherein the at least one air bag comprises:
    a front air bag for covering a chest portion of the rider and a rear air bag for covering a back portion of the rider, and the at least one hard protector comprises a front hard protector and a rear hard protector, and
    the front hard protector is provided on the front air bag, and the rear hard protector is provided on the rear air bag.

12. The vehicular air bag system according to claim 11, and further including an inflator operatively connected to said rear air bag for inflating said front air bag and said rear air bag and for deploying said front hard protector and said rear hard protector upon actuation of said inflator.

13. The vehicular air bag system according to claim 12, and further including
    a control cord, and
    an impact sensor on the vehicle for sensing an impact force on the vehicle,
    wherein one end of the control cord is connected to said inflator, and an opposite end of the control cord is connected to a coupler of a detachable starting switch provided at a rear portion of the vehicle,
    wherein the detachable starting switch is adapted to detach from the vehicle when the sensed impact force exceeds a predetermined value, thereby actuating said inflator.

14. The vehicular air bag system according to claim 11, and further including a tube-shaped communication path operatively provided between said front air bag and said rear air bag for providing communication therebetween from said inflator to said front air bag and said rear air bag.

15. The vehicular air bag system according to claim 10, wherein the at least one air bag extends substantially across the entire chest or back of the rider in a continuous manner for providing rider protection.

16. The vehicular air bag system according to claim 10, and further including an inflator operatively connected to said at least one air bag for inflating said at least one air bag and deploying said at least one hard protector upon actuation of said inflator.

17. The vehicular air bag system according to claim 16, and further including
a control cord, and
an impact sensor on the vehicle for sensing an impact force on the vehicle,
wherein one end of the control cord is connected to said inflator, and an opposite end of the control cord is connected to a coupler of a detachable starting switch provided at a rear portion of the vehicle,
wherein the detachable starting switch is adapted to detach from the vehicle when the sensed impact force exceeds a predetermined value, thereby actuating said inflator.

18. The vehicular air bag system according to claim 10, wherein the at least one hard protector is constructed of a material selected from the group consisting of polyamide, polypropylene, aluminum, and titanium.

19. A vehicular air bag system for a rider to cushion an impact on the rider, the vehicular air bag system comprising:
a front air bag and a rear air bag for respectively covering a front and a back of the rider, the front and rear air bags being provided on a clothing article worn by the rider; and
a front hard protector and a rear hard protector arranged on a respective central portion of the front and rear air bags for dispersing an impact acting on either or both of the front and rear air bags,
each of hard protectors having a width and a length approximately and smaller than a width and a length of the respective air bag.

20. The vehicular air bag system according to claim 19, further including an inflator operatively connected to said at least one of the front and rear air bags for inflating the air bags and deploying the hard protectors upon actuation of the inflator.

21. The vehicular air bag system according to claim 19, wherein at least the front air bag is substantially rectangular shaped and at least the front hard protector is a substantially rectangular plate,
wherein the front hard protector is centrally arranged on the front airbag such that side edges of the front hard protector are substantially parallel to and inward of side edges of the front air bag.

* * * * *